United States Patent Office 3,446,740
Patented May 27, 1969

3,446,740
MINERAL OIL IMPROVED IN POUR POINT BY HYDROGENATED HYDROXY DIENE POLYMER
David W. Young, Homewood, Patrick W. Ryan, Chicago Heights, and Henry V. Isaacson, Oak Forest, Ill., assignors to Sinclair Research, Inc., New York, N.Y., a corporation of Delaware
No Drawing. Continuation of application Ser. No. 510,397, Nov. 29, 1965. This application Oct. 25, 1967, Ser. No. 678,495
Int. Cl. C10m 1/20, 1/00
U.S. Cl. 252—52               10 Claims

ABSTRACT OF THE DISCLOSURE

A reduced pour point composition is disclosed. The composition consists of a major amount of a liquid mineral oil boiling primarily above the gasoline range and sufficient diene polymer to reduce the pour point of the mineral oil. The diene polymer has at least about 25% of its unsaturation reduced with hydrogen, at least about 1.8 predominantly primary, terminal hydroxyl groups per molecule, and a staudinger molecular weight of about 2000 to 25,000 and is the product of the polymerization of a diene of 4 to about 12 carbon atoms.

---

This application is a continuation of application Ser. No. 510,397 filed Nov. 29, 1965, now abandoned.

This invention relates to a novel polymer having utility as a mineral oil pour point depressor. More specifically, the invention is directed to a pour depressor which is hydrogenated hydroxyl-containing diene polymer.

It is known in the art to add pour depressors to mineral base oils in order to permit their flow at low temperatures. Many different types of materials depress the pour point of hydrocarbon oils but most of the additives have to be employed in disadvantageously large concentrations to provide the desired results. Moreover, although use of certain polymers as pour depressors is known, most hydrocarbon polymers, as demonstrated by U.S. Patent No. 3,048,479 to Ilnyckyj et al., are not effective as pour point depressors and many in fact increase the pour point.

It has now been found that a base oil-soluble, hydrogenated, hydroxyl-containing diene polymer when added to a base mineral oil in small, effective amounts, substantially reduces the pour point of the oil. This finding is particularly surprising in that neither the unhydrogenated hydroxyl-containing diene polymer nor the hydroxyl-free diene polymer, whether hydrogenated or not, is an effective pour point depressor.

The diene polymers to be hydrogenated to produce the pour point depressor of the invention generally have on the average at least about 1.8 predominantly primary, terminal, i.e., attached to a terminal carbon atom, hydroxyl groups per polymer molecule. Most advantageously, the polymer has greater than two average allylic, terminal hydroxyl groups, e.g., at least 2.1 to, say, 2.6 or even 3 or more. Also, two terminal hydroxyls are generally separated by a long carbon-carbon chain. Determined as milli-equivalents of potassium hydroxide equivalent to the hydroxyl content of one gram of polymer, the diene polymers will often have a hydroxyl value of about 0.5 to 1.5, preferably 0.7 to 1.0. The hydroxyl-containing diene polymers used in the present invention have number average molecular weights in the range of about 200 to 25,000 (Staudinger) and viscosities at 30° C. of about 5 to 20,000 poises. The preferred polymers will be in the molecular weight range of about 1200 to 7000 with viscosities at 30° C. of about 15 to 5000 poises. The preferred diene polymers also have the majority of their unsaturation in the main hydrocarbon chains.

The dienes which are employed to make the hydroxy-containing polymers are unsubstituted, 2-substituted or 2,3-disubstituted 1,3-dienes of up to about 12 carbon atoms. The diene preferably has up to 6 carbon atoms and the substituents in the 2- and/or 3-position may be hydrogen, alkyl, generally lower alkyl, e.g., of 1–4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, etc.

Mono-olefinically unsaturated monomers may also be incorporated into the diene polymers used in this invention. Generally, they will be present only in minor amounts, say up to about 40 percent by weight of the total monomers. Usable monomers include alpha-mono-olefinic materials of about 2 or 3 to 10 or 12 carbon atoms such as styrene, vinyl toluene, methyl methacrylate, methacrylate, acrylic esters, acrylonitrile, vinyl chloride, etc.

The number and location of the hydroxyl groups and the molecular weight of the diene polymer may be a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place at a temperature of about 100–200° C., preferably about 115–200° C. The reaction preferably takes place in a mutual solvent system; that is, one which dissolves both the diene monomer and the hydrogen peroxide. Suitable solvents are isopropanol, acetone, methanol, sec-butanol, n-butanol, n-propanol and the like alcohols having 2 to about 12 carbon atoms. The $H_2O_2$-solvent system is found to supply hydroxyl groups and the catalytic and solvent effects needed to produce the diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymer. The alcohol will be free of any group which would interfere with the production of the diene polymer. Saturated alcohols are preferred and often those having about the same carbon atom content as the diene monomer will be found most useful. For example, when the monomer is butadiene, propanol or isopropanol may be preferred. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 to 10 percent of the reaction mixture to assure a low molecular weight addition polymer product having the desired number of hydroxyl groups per molecule.

By the above-described polymerization method, polymers, especially in the above-indicated molecular weight ranges, are produced from diene monomers in which aqueous hydrogen peroxide is virtually insoluble. If the monomer material is merely mixed with aqueous hydrogen peroxide, then two phases result and only a very small amount of solid polymer is produced at the interface between them. However, when there is combined with an appropriate amount of aqueous hydrogen peroxide an appropriate proportion of mutual solvent-diluent, then this combination, when added to butadiene, for example, forms a clear homogeneous solution therewith and at elevated temperature, e.g., above 100° C., preferably about 115 to 200° C. polymerization is initiated which can be controlled to maintain the polymerization at desired temperature, to obtain in say 1 to 4 hours a conversion of from about 40% to about 60% of the monomer to polymer. The product, when freed of unreacted and residual materials, is a clear-white, viscus liquid polybutadiene predominantly of 1,4 configuration.

To cite an example of the preferred chemical structure of the diene polymer of this invention, a simplified structural formula of polybutadine may be given as:

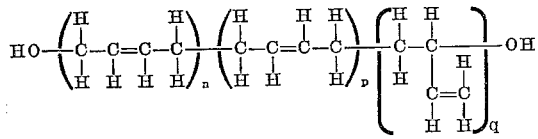

in which $n$ plus $p$ is greater than $q$, that is, the in-chain unsaturation accounts for more than 50% of the unsaturation. One or more of the H atoms appearing in the above formula will be replaced by hydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter $n$ may be a number sufficient to give a cis-1,4- unsaturation content of about 10–30 percent; $p$ may be a number sufficient to give a trans-1,4-unsaturation content to the polymer in the range of about 40–70 percent while $q$ may be sufficient to give a pendant 1,2-vinyl unsaturation of about 10–35 percent. Often the polymer will contain largely trans-1,4-units, e.g. about 50–65 percent, and about 15–25 percent cis-1,4-units, with about 15–25 percent 1,2-units. Branching may also occur in the above polymers, especially those prepared at higher temperatures. It should be emphasized, however, that the present invention is not necessarily limited to the use of hydroxyl-containing diene polymers having the predominating trans-1,4-structure, although such are highly preferred where otherwise suitable polymers having high cis-1,4-forms are available.

Hydrogenation of the diene polymer may be carried out utilizing conventional hydrogenation procedures and conditions, with a hydrogenation catalyst. Suitable hydrogenation catalysts can be used such as the metals of group VIII, e.g., nickel, a platinum group metal, etc. The promoting metal may be supported in its elemental, oxide, sulfide or other combined form on a solid carrier such as activated alumina, silica, charcoal, etc. When supported, the catalytic metal is usually the minor portion of the catalyst. Other known hydrogenation catalysts are the oxides of tungsten, chromium, vanadium, titanium, molybdenum, etc. Preferably, the hydrogenation is conducted at elevated pressures, e.g., about 150 to 600 pounds per square inch gauge, using temperatures of about room temperature to 150° C. and having Raney nickel as the catalyst. It is also preferred to first dissolve the diene polymer in a suitable solvent prior to the hydrogenation. Illustrative of suitable solvents are inert hydrocarbon solvents of 5 to 10 carbon atoms, for instance, hexane, heptane, octane, benzene, naphthalene, etc. In addition, oxygenated solvents such as tetrahydrofuran, etc., may also be employed provided the solvent is stable to the reaction conditions.

The hydrogenation is advantageously conducted for a time sufficient to saturate at least about 25% of the unsaturation contained in the diene polymer (as measured by Nuclear Magnetic Resonance). The hydroxyl groups of the polymer remain substantially unchanged, as hydrogenation occurs selectively at the olefinic sites. Complete saturation of the polymer is unnecessary, and in fact, our data indicate that hydrogenating more than about 50% of the unsaturation does not provide any further improvemen in pour depressor effectiveness.

Among the mineral oil bases which are improved in accordance with this invention are normally liquid petroleum oils boiling primarily above the gasoline range and including for instance, lubricating oils, diesel fuels, fuel oils, etc. These oils are often petroleum distillates and commonly have relatively high pour points, for instance, at least about −10° F. or higher.

The oils can be in the relatively crude state or they can be treated in accordance with well known commercial methods, such as acid or caustic treatment, solvent refining, clay treatment, hydrotreating, etc. Fuel oils which can be improved by the hydrogenated polymers of the invention are, for instance, hydrocarbon fractions boiling primarily in the range of about 300° to 750° F. The fuel oils can be straight run distillate fuel oils, catalytically or thermally cracked distillate fuel oils or mixtures of straight run fuel oils, naphthalenes and the like with cracked distillate stocks. The cracked material will frequently be about 15–70 volume percent of the fuel. Oils of lubricating viscosity which can be improved by addition of the polymers of the invention are, for instance, solvent extracted or solvent refined oils obtained in accordance with conventional methods of solvent refining lubricating oils. Often the lubricating oils have viscosities from about 20 to 250 SUS at 210° F. The base oil may be derived from paraffinic, naphthenic, asphaltic or mixed base crudes. Also a blend of refined lubricating oils such as a blend of solvent treated Mid-Continent neutrals and Mid-Continent bright stocks may be employed.

The amount of the hydrogenated, hydroxyl-containing diene polymer added to the base oil may be dependent upon the particular oil employed, but in all cases, will be that sufficient to reduce the pour point significantly. Often the amounts will fall within the range of about 0.01 to 2% or more by weight, preferably about 0.05 to 1% by weight based on the mineral oil. The composition of the invention may also contain other additives commonly added to such base oils as, for instance, antioxidants, extreme pressure agents, viscosity index improvers, corrosion inhibitors, and the like.

The following example will serve to further illustrate the present invention.

Example

To a glass bottle containing 10 parts of aqueous (50% by weight) hydrogen peroxide were added 70 parts isopropanol and 100 parts butadiene-1,3. The bottle was capped and placed in a steam pressure chamber and held at 118° C. for two hours. After cooling, the bottle was opened and from the polybutadiene therein the volatiles were removed, e.g., butadiene-1,3, butadiene dimer, isopropanol, acetone, residual hydrogen peroxide, water, etc. This removal was accomplished with the aid of heat and vacuum followed by steam and vacuum. The resulting product was a clear, viscous liquid polybutadiene having a hydroxyl value of 0.88 meq./g., about 2.2 terminal, allylic hydroxyl groups (predominantly primary) per molecule, a molecule weight of approximately 2200 and a viscosity of 45 poises.

The polybutadiene oil thus prepared and having an iodine number of over 300 was placed in tetrahydrofuran to make a 10% by weight solution. The polymer solution was then hydrogenated at 25–105° C. and at pressures of 180 to 485 p.s.i.g. for about three hours employing as the hydrogenation catalyst Raney nickel. At the end of the hydrogenation the solvent was removed and the product had an iodine number of 174.7, a carbon value of 88.83% and a hydrogen value of 12.37%. The Nuclear Magnetic Resonance indicated that 50% of the unsaturated part of the polybutadiene oil was hydrogenated.

In a second hydrogenation, a portion of the polybutadiene oil prepared above was similarly hydrogenated at 25 to 105° C. and at pressures of 180 to 560 p.s.i.g. but for a period of seven hours so that 80% of the unsaturation in the polymer oil was hydrogenated.

The hydrogenated polybutadiene oils thus prepared were evaluated as pour depressors in a No. 2 fuel oil and a lubricating oil. The No. 2 fuel oil was a blend of 50% straight run gas oil and 50% catalytically cracked gas oil. The lubricating oil was a Mid-Continent neutral oil having a viscosity index of 98 and a viscosity at 210° F. of 52 SUS. The results of the test are shown in the table below. For comparison, runs with the hydroxyl-containing polybutadiene oil which was not hydrogenated and with hydroxyl-free polybutadiene oils unhydrogenated and 50% hydrogenated are included. The non-hydroxyl polymer is a polybutadiene oil prepared by sodium catalysts and is essentially free of hydroxyl groups.

TABLE

| | 0.1% | 0.05% | 0.025% | 0.00% |
|---|---|---|---|---|
| No. 2 fuel+unhydrogenated, hydroxyl-containing polymer oil (° F.) | −5 | −5 | −5 | −5 |
| No. 2 fuel+hydrogenated, hydroxyl-containing polymer oil (50% hydrogenated) (° F.) | −55 | −30 | −10 | −5 |
| No. 2 fuel+hydrogenated, hydroxyl-containing polymer oil (80% hydrogenated) (° F.) | −45 | −25 | −5 | −5 |
| Lubricating oil+50% hydrogenated hydroxyl-containing polymer oil (° F.) | −10 | −5 | 0 | +10 |
| No. 2 fuel+unhydrogenated, hydroxyl-free polymer oil (° F.) | −10 | | | −5 |
| No. 2 fuel+50% hydrogenated, hydroxyl-free polymer oil (° F.) | −10 | | | −5 |

The data demonstrate that of the four types of diene polymers here tested, i.e., hydrogenated or unhydrogenated, and hydroxyl-containing or hydroxyl-free, only one, that which is both hydrogenated and hydroxyl-containing, is highly effective as a mineral oil pour point depressant. The remaining three are shown not to exhibit significant, if any, pour depressing properties.

It is claimed:

1. A composition of reduced pour point consisting essentially of a major amount of a liquid mineral oil boiling primarily above the gasoline range and a small, effective amount of a diene polymer having at least about 25% of its unsaturation reduced with hydrogen, at least about 1.8 predominantly primary, terminal hydroxyl groups per polymer molecule, and a Staudinger molecular weight of about 200–25,000, said diene having 4 to about 12 carbon atoms and said amount of diene polymer being sufficient to reduce the pour point of said mineral oil.

2. The composition of claim 1 wherein the diene is 1,3-butadiene.

3. The composition of claim 1 wherein the hydrogenated diene polymer has a hydroxyl value of about 0.7 to 1.0 and a molecular weight of about 1200 to 7000.

4. The composition of claim 1 wherein the hydrogenated diene polymer is present in an amount of about 0.01 to 2% by weight of the mineral oil.

5. The composition of claim 1 wherein the mineral oil is a distillate fuel oil.

6. The composition of claim 1 wherein the mineral oil is of lubricating viscosity.

7. A composition of reduced pour point consisting essentially of a major amount of a liquid mineral oil boiling primarily above the gasoline range and about 0.01 to 2%, by weight of the mineral oil, of a 1,3-butadiene polymer having about 25 to 50% of its unsaturation reduced with hydrogen, about 2.1 to 3 predominantly primary, terminal hydroxyl groups per polymer molecule, and a Staudinger molecular weight of about 1200 to 7000.

8. The composition of claim 7 wherein the 1,3-butadiene polymer has a hydroxyl value of about 0.7 to 1.0.

9. The composition of claim 8 wherein the mineral oil is a distillate fuel oil.

10. The composition of claim 8 wherein the mineral oil is of lubricating viscosity.

References Cited

UNITED STATES PATENTS

| 2,429,582 | 10/1947 | Morris et al. | 260—680 X |
| 2,551,641 | 5/1951 | Seger et al. | 252—52 X |
| 2,792,382 | 5/1957 | Edmonds | 252—52 X |
| 2,798,853 | 7/1957 | Young et al. | 252—59 X |
| 3,312,621 | 4/1967 | Brownawell et al. | 252—59 |
| 3,329,613 | 7/1967 | Fischer et al. | 252—59 |

FOREIGN PATENTS 585,923  2/1947  Great Britain.

DANIEL E. WYMAN, *Primary Examiner.*

W. H. CANNON, *Assistant Examiner.*

U.S. Cl. X.R.

252—55; 44—62, 77